Patented July 8, 1941

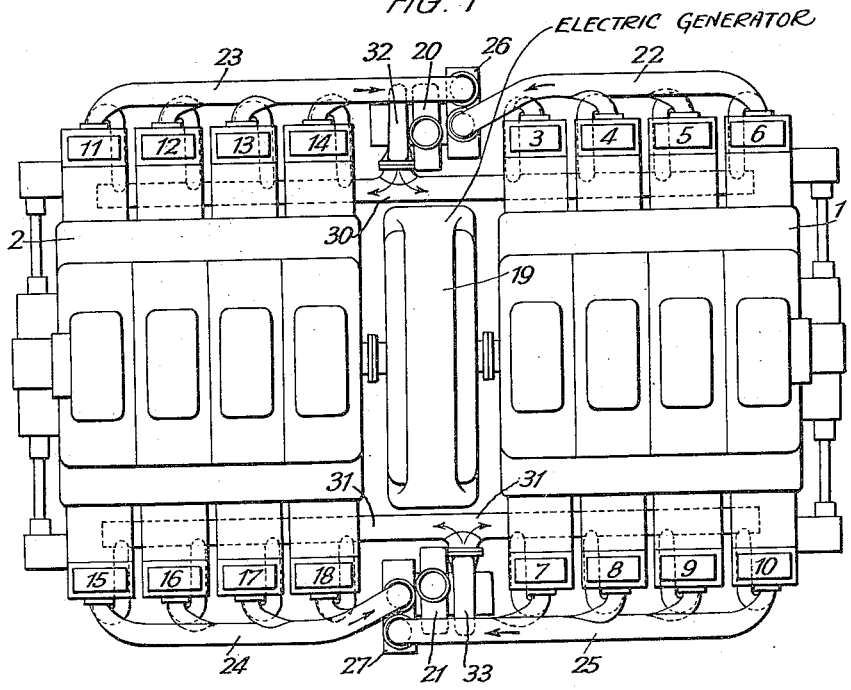
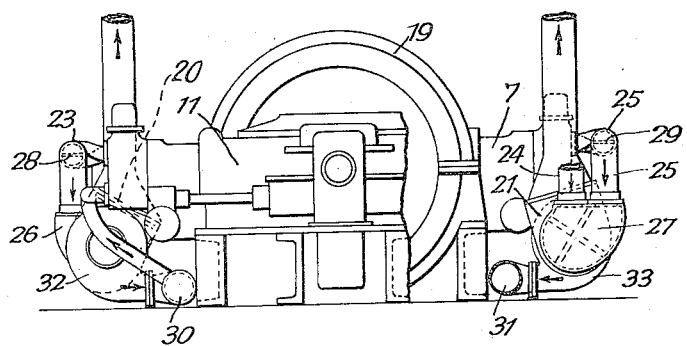

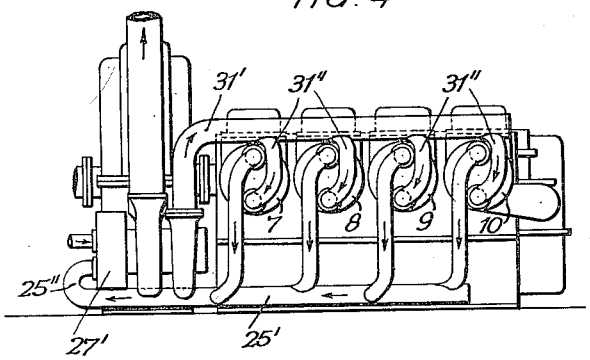
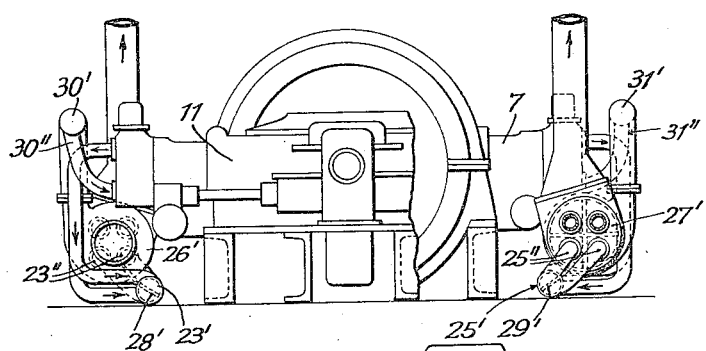
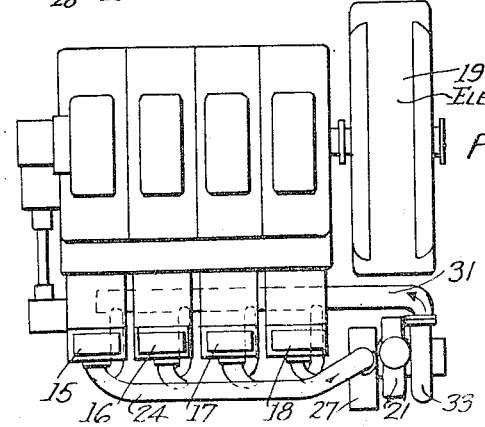

2,248,423

UNITED STATES PATENT OFFICE 2,248,423

EXHAUST GAS TURBO-BLOWER MEANS FOR HORIZONTAL INTERNAL COMBUSTION ENGINES

Alfred Büchi, Winterthur, Switzerland

Application January 25, 1940, Serial No. 315,626
In Great Britain February 6, 1939

8 Claims. (Cl. 60—13)

This invention relates to exhaust gas turbo-blower means for horizontal internal combustion engines.

The invention is particularly concerned with the arrangement of exhaust gas turbo-blower means with horizontal internal combustion engines.

With vertical internal combustion engines it is known to arrange the exhaust gas turbo-blower means at the end of a cylinder block laterally of the axis of the engine considerably above the crank shaft thereof. The exhaust gas and the charging air conduction means of these engines extend transversely to the cylinders in spaced relation at high levels above the engine foundation.

In the arrangement according to the invention, one or more exhaust gas turbo-blower units are arranged at the driving end of the internal combustion engine at the side of the adjacent engine cylinders laterally of an electric generator or other driven part taking up the load, such as, for example, a fly-wheel, driven by the engine, and are mounted substantially on a level lower than that of the crank shaft of the internal combustion engine, the exhaust gases from the internal combustion engine cylinders being conducted toward the exhaust gas turbo-blower unit and the charging air being conducted away from this unit into the engine cylinders by means of spaced conduits extending transversely to the cylinders at relatively low levels above the engine foundation.

In horizontal internal combustion engines comprising two separate groups of cylinders with both cylinder groups located on one and the same side of the aligning crank shafts thereof and with a driven machine, such as a generator, arranged between these two groups, the installation of only one exhaust gas turbo-blower unit between the two cylinder groups is possible so that the exhaust gases discharged by all the engine cylinders can be passed in opposite directions to this turbo-blower. In horizontal internal combustion engines in which two separate groups of cylinders are arranged "vis-à-vis," that is, are juxtaposed to each other across a common crankshaft, the installation of a turbo-blower unit on either end of the adjacent cylinder groups is feasible. In horizontal internal combustion engines comprising two or more pairs of groups of engine cylinders juxtaposed to each other across a common crank shaft and an electric generator or a fly-wheel etc. driven by the engine and located between adjacent groups, the installation of two exhaust gas turbo-blower units symmetrically to the axis of the aligning engine crank shafts laterally thereof beyond the generator or the like is possible. With this arrangement each unit may receive the exhaust gases from all the cylinders of one of the two sides of the internal combustion engine and the respective blower in turn may supply the charging air to all the cylinders on the corresponding side.

The arrangement according to the invention has the advantage that the extra space requirement for the installation of the exhaust gas turbo-blower unit beyond the normal contour line of the engine is eliminated and that the exhaust gas conduits and the charging air conduits can be arranged so as not to impair the accessibility to the engine cylinders. A preferred arrangement of these conduits consists in disposing the charging air conduits extending from the blower to the engine cylinders near or immediately above the foundation of the engine, that is, the surrounding engine room floor level with the foundation, and disposing the exhaust gas conduits extending from the engine cylinders to the exhaust gas turbine substantially at the level of the engine cylinders. If required by conditions of actual practice an arrangement may be chosen in which the exhaust gas manifolds are nearer to the engine room floor than the air conduits.

Several embodiments of the invention are illustrated in the accompanying drawings by way of example only, in which Fig. 1 is a plan view of a horizontal internal combustion engine having two pairs of juxtaposed groups of engine cylinders;

Fig. 2 is an end view of Fig. 1;

Fig. 3 is a view similar to Fig. 2 of a modified arrangement;

Fig. 4 is a side elevation of Fig. 3 as seen from the right hand side in the latter figure; and Fig. 5 is a plan view of a modified embodiment of the invention having only one group of engine cylinders.

In the embodiments shown in Figs. 1 and 2, and 3 and 4, each of the two pairs 1, 2 of juxtaposed groups of engine cylinders comprises eight cylinders 3, 4, 5, 6, 7, 8, 9, 10 and 11, 12, 13, 14, 15, 16, 17, 18 respectively. The internal combustion engine drives an electric generator 19 of the vertical type arranged between the two pairs of cylinder groups and having a rotor, the shaft of which aligns with the crankshaft of the engine. According to the invention, the exhaust gas turbo-blower units 20, 21 are arranged above the floor level of the engine room one on each engine side between the pairs 1, 2 of juxtaposed cylinder groups and laterally beside the electric generator. The exhaust gases from the engine cylinders are passed into exhaust gas turbines 26, 27 through conduits 22, 23, 24, 25, in such manner, that the cylinder groups located on the same side of the engine deliver the exhaust gases discharging therefrom to one and the same exhaust gas turbine.

The conduits 22 to 25 may be subdivided by partition walls 28, 29 respectively, as shown in Fig. 2, in accordance with the cross-sectional areas of the corresponding chambers of the admission guide device of the respective turbine, the partition wall between the chambers of the turbine 27 being indicated by dotted lines in the lower right hand corner of this figure.

Instead of subdividing the exhaust gas conduits or manifolds a corresponding number of separate conduits may be used for conducting the respective gas volumes to the associated turbine. Thus, in this instance as shown in Fig. 3 eight separate conduits may be used for admitting the exhaust gas to the two turbines, and the admission guide device of each turbine is provided with four different chambers. With this arrangement, for example, only two cylinders exhaust to the same turbine inlet chamber as, for instance, cylinders 3 and 5; 4 and 6; 7 and 9; 8 and 10; 11 and 13; 12 and 14; 15 and 17; and 16 and 18. The charging air delivered by the exhaust gas turbo-blowers 32, 33 is passed into the engine cylinders 3 to 18 through conduits 30, 31 arranged at a low level, in such manner, that a single charging air blower supplies all the cylinders on one and the same side of the engine, i. e. the same cylinders from which the discharging exhaust gases are conducted through separate or partitioned-off conduits, into the driving turbines 26, 27 respectively.

In the arrangement shown in Figs. 1 and 2 the exhaust manifolds 22 to 25 and the charging air conduits 30, 31 are so located that the former conduits extend away from the engine cylinders substantially at the same level therewith so that the gases enter the turbines from above, whereas the charging air supply conduits 30, 31 extend below the cylinders immediately above the engine foundation. The charging air blowers are provided with an exit which delivers the charging air in the horizontal direction. The air conduits are disposed longitudinally of the outer margin of the engine frame. Advantageously, the exhaust gas turbo-blower units are so mounted that their axes extend in a plane parallel to the axis of the engine. Instead of exhaust gas turbo-blower units of horizontal type, as shown in the drawings, units of vertical type may be provided.

The arrangements, according to all embodiments of the invention, have the appreciable advantage that no extra space requirements are necessary for the arrangement of the exhaust gas turbo-blower units in addition to the space required for the internal combustion engine proper and its driven element, so that these units remain within the general contour line of an internal combustion engine plant. The arrangement of the exhaust gas and of the charging air conduits becomes very simple so that these conduits are separated from each other and are exposed to view throughout their extent and that the conduits are unsusceptible to influences such as transmission of heat between the same. In arrangements comprising two groups of engine cylinders confronting each other across a common crankshaft two like exhaust gas turboblowers can be used which are mounted in relatively inverted disposition at one end of the engine.

If a single pair of groups of cylinders is employed, which arrangement is not specifically shown in the drawings, the location of the turboblower unit is absolutely the same as shown in Figs. 1 and 2 of the drawings except that one pair of groups of cylinders is omitted together with the respective conduits for the charging air and the exhaust gases. However, the relative positions of the blower unit to the engine cylinders and to the electric generator or the like remain the same.

In the modified arrangement shown in Figs. 3 and 4, the exhaust gas manifolds extend alongside of the engine frame transversely to the engine cylinders with the underside located immediately above the engine foundation, that is, the engine room floor. These manifolds, of which only those referred to as 23' and 25' are visible, are subdivided by partition walls 28', 29' into two separate passages leading into the associated turbines 26', 27', that is, the admission guide devices thereof, through branch pipes 23", 25", respectively, from below. The spent exhaust gases escape in the direction of the arrow at the top. The charging air conduits 30', 31' extend substantially parallel with the exhaust manifolds about on the level of the engine cylinders. Branch pipes 30", 31" connect the conduits 30', 31' and the respective pipe connections on the engine cylinders with each other. Also in this instance the exhaust manifolds and the air conduits are spaced apart at a distance so that they are unsusceptible to heat transmission between the same and, if desired, several collateral exhaust conduits may be used instead of a subdivided manifold.

The term subsidiary group of cylinders is intended to designate a part of a complete group of cylinders from which the exhaust gases are led separately to the exhaust gas turbine or turbines and more particularly into a separate admission chamber of one or more associated turbines. Fig. 4 is illustrative of such an arrangement in which two groups of cylinders 7, 9 and 8, 10 exhaust into separate chambers of the admission guide device of turbine 27'. Either one of these groups may serve as a subsidiary group for the other dependent upon the operation of the engine in practice.

Fig. 5 illustrates the simplest form of the invention, in which only a single group of cylinders 15, 16, 17 and 18 is present. In this case the location of the turbo-blower 21 is located at the driving end of the engine in a similar position relative to the electric generator 19, as in the previously described embodiments, and also is located at a level substantially lower than the level of the engine crankshaft at the side of the engine cylinders, laterally of the generator 19, and within the prolongation of the generator and of the engine manifold means 24, when viewed in plan. This turbo-blower is also dismountable at the engine foundation level independently of the engine and the generator driven thereby.

What I claim is:

1. In a power plant; an internal combustion engine having a plurality of substantially horizontal cylinders with pistons therein and a crankshaft, said pistons being operatively connected with the engine crankshaft, a driven part, the driving end of said crankshaft being coupled to said driven part, exhaust gas driven turbo-blower means, spaced exhaust gas and charging air manifold means connected to the outer ends of said cylinders and extending transversely to said cylinders substantially within the vertical extent of the cylinders and the engine foundation, the turbo-blower means having a rotary shaft, means providing communication between the turbine and blower parts and the respective engine manifold means, said turbo-blower means being mounted at said driving end of the engine shaft with its rotary shaft directed substantially parallel with the crankshaft axis on a level substantially lower than the level of the crankshaft at the side of the respective engine cylinder laterally of said driven part within the prolongation of the contour of said part and that of the contour of said manifold means, when viewed in plan, said turbo-blower means and said manifold means being dismountable at said foundation level independently of said engine and said driven part.

2. In a piston-operated internal combustion engine adapted to be charged by exhaust gas turbo-blower means, a driven part adjacent said engine, the engine having a plurality of horizontal engine cylinders arranged in groups with the cylinders of said groups opposed to each other, the engine having a crankshaft driven by the pistons of the associated cylinder groups lying between said groups and having a driving end coupled to said adjacent driven part, spaced exhaust gas and charging air manifold means connected to the outer ends of the associated cylinder groups and extending transversely to said groups substantially within vertical extent of the cylinders and the engine foundation, two turbo-blower units each having a rotary shaft, means providing communication between the turbine and blower parts and the respective engine manifold means, said turbo-blower units being mounted at said driving end of the engine with their rotary shafts extending substantially parallel with the crankshaft axis at a level substantially lower than the crankshaft level at the side of the respective engine cylinders laterally of said driven part within the prolongation of the contour of said part and that of the contour of said manifold means, when viewed in plan, said turbo-blower units and said manifold means being dismountable at said foundation level independently of said engine and of said driven part.

3. In a power plant, a piston-operated internal combustion engine, exhaust gas turbo-blower means for charging said engine, said engine having a plurality of horizontal cylinders extending above a surrounding floor, which floor is level with the engine foundation, said cylinders having pistons operatively connected with the engine crankshaft, the driving end of the shaft being coupled to an adjacent driven part, exhaust gas and charging air manifold means connected to the outer ends of said cylinders and extending transversely to said cylinders, said exhaust gas manifold means being located substantially at the level of said cylinders, and said charging air manifold means being located near the level of said floor, the turbo-blower means comprising a unit having a rotary shaft, and means providing communication between the turbine and blower parts of said unit and the respective manifold means, said unit being mounted at said driving end of the engine crankshaft with its rotary shaft directed substantially parallel with the crankshaft axis at a level substantially lower than the crankshaft level at the side of the respective engine cylinder laterally of said driven part within the prolongation of the contour of said part and that of the contour of the respective exhaust manifold means, when viewed in plan, said turbo-blower unit and said exhaust and charging air manifold means being dismountable at said floor level independently of said engine.

4. In a power plant, a piston-operated internal combustion engine, exhaust gas turbo-blower means for charging said engine, said engine having a plurality of horizontal cylinders extending above a surrounding floor, which floor is level with the engine foundation, said cylinders having pistons operatively connected with the engine crankshaft, the driving end of said shaft being coupled to an adjacent driven part, exhaust gas and charging air manifold means connected to the outer ends of the cylinders and extending transversely to said cylinders, said exhaust gas manifold means being located near the level of said floor, and said charging air manifolds being located substantially at the level of said cylinders, said turbo-blower means comprising a unit having a rotary shaft, means providing communication between the turbine and blower parts of said unit and the respective engine manifold means, said unit being mounted at said driving end with its rotary shaft directed substantially parallel to the crankshaft axis, said rotary shaft being at a level substantially lower than the crankshaft level at the side of the respective engine cylinder laterally of said driven part within the prolongation of the contour of said part and that of the contour of the respective charging air manifold means, when viewed in plan, said turbo-blower unit and said exhaust and charging air manifold means being dismountable at said floor level independently of said engine.

5. In a power plant, a piston-operated internal combustion engine, exhaust gas turbo-blower means for charging said engine, said engine having a plurality of horizontal cylinders arranged in groups opposed to each other, said cylinders having pistons drivingly connected to the engine crankshaft, the crankshaft being positioned between the associated cylinder groups and having a driving end coupled to an adjacent driven part, spaced exhaust gas and charging air manifold means connected to the outer ends of the associated cylinder groups and extending transversely to said groups substantially within the vertical extent of the cylinders and the engine foundation, two turbo-blower units each having a rotary shaft, means providing communication between the turbines and blower parts and the respective manifold means, said units being mounted at the driving end of the crankshaft with their rotary shafts directed substantially parallel with the crankshaft axis and at a level substantially lower than the crankshaft level at the sides of the respective engine cylinder in symmetrical relation to said crankshaft axis in relatively opposite relation of said turbine and blower parts laterally of said driven part within the prolongation of the contour of said part and that of the contour of said manifold means, when viewed in plan, said turbo-blower units and said manifold means being dismountable at said foundation level independently of said engine and said driven part in the form of two congruent self-contained assemblies.

6. In a power plant, a piston-operated internal combustion engine, exhaust gas turbo-blower means for charging said engine, said engine having a plurality of horizontal cylinders having pistons operatively connected with the engine crankshaft, said crankshaft having a driving end coupled to an adjacent driven part, spaced exhaust gas and charging air manifold means connected to the outer ends of the associated cylinder and extending transversely substantially within the vertical extent of the cylinders and the engine foundation, a turbo-blower unit, having a turbine and a blower part surrounding a common rotor shaft, and a multi-chamber admission guide device provided in said turbine part, said exhaust gas manifold means leading said gas from said cylinders separately for a part of their extent into different chambers of said guide device and said charging air manifold means leading said air from said blower part into said cylinders, said unit being mounted at said driving end with its rotor shaft directed substantially parallel to the crankshaft axis at a level substantially lower than the crankshaft level at the side of the respective engine cylinder laterally of said driven part within the prolongation of the contour of said part and that of the contour of said manifold means, when viewed in plan, said turbo-blower unit and said manifold means being dismountable at said foundation level independently of said engine and said driven part.

7. In a piston-operated internal combustion engine, exhaust gas turbo-blower means for charging said engine, a plurality of horizontal engine cylinders arranged in groups opposed to each other, the engine having pistons and a crankshaft driven by said pistons and lying between said groups of cylinders, the driving end of said crankshaft being coupled to an adjacent driven part, spaced exhaust gas and charging air manifold means connected to the outer ends of the associated cylinder groups and extending transversely to said groups substantially within the vertical extent of said cylinders and the engine foundation, two similar turbo-blower units each having a turbine and a blower part surrounding a common rotary shaft, and a multi-chamber admission guide device provided in said turbine part, said exhaust gas manifold means leading the gas from part of the cylinders of each cylinder group separately into different chambers of said guide device and said charging air manifold means leading said air from said blower part into said cylinders of said groups, said units being mounted at said driving end with their rotary shafts directed substantially parallel with the crankshaft axis at a level substantially lower than the crankshaft level at the side of the respective engine cylinder in symmetrical relation to said crankshaft axis in relatively inverted sequence of said turbine and blower parts laterally of said driven part within the prolongation of the contour of said part and that of the contour of said manifold means, when viewed in plan, said turbo-blower units and said manifold means being dismountable at said foundation level independently of said engine and said driven part.

8. In a piston-operated internal combustion engine, exhaust gas turbo-blower means for charging said engine, said engine having a plurality of horizontal cylinders arranged in groups opposed to each other, said groups having sub-groups, the pistons of the associated cylinder groups inclusive of their sub-groups being drivingly connected to the crankshaft, the crankshaft lying between said groups and having a driving end coupled to an adjacent driven part, spaced exhaust gas and charging air manifold means connected to the outer ends of the associated cylinder groups and their sub-groups and extending transversely to said groups substantially within the vertical extent of the cylinders and the engine foundation, a turbo-blower unit, having a turbine and a blower part surrounding a common rotor shaft, and a multi-chamber admission guide device provided in said turbine part, said exhaust gas manifold means being connected to the turbine admission means and leading said gas from part of the cylinders of said cylinder groups and their sub-groups of cylinders separately into different chambers of said guide device and said charging air manifold means leading said air from said blower part into said cylinders of said groups, said unit being mounted at said driving end with its rotor shaft directed substantially parallel with the crankshaft axis at a level substantially lower than the crankshaft level at the side of the respective engine cylinder laterally of said driven part within the prolongation of the contour of said part and that of the contour of said manifold means, when viewed in plan, said turbo-blower unit and said manifold means being dismountable at said foundation level independently of said engine and said driven part.

ALFRED BÜCHI.